US011394599B2

(12) United States Patent
Keeni

(10) Patent No.: US 11,394,599 B2
(45) Date of Patent: Jul. 19, 2022

(54) SYSTEM FOR ESTIMATING CONTACT DURATION BETWEEN A PAIR OF COMMUNICATION APPARATUSES

(71) Applicant: CYBER SOLUTIONS INC., Miyagi (JP)

(72) Inventor: Glenn Mansfield Keeni, Miyagi (JP)

( * ) Notice: Subject to any disclaimer, the term of this patent is extended or adjusted under 35 U.S.C. 154(b) by 24 days.

(21) Appl. No.: 16/980,402

(22) PCT Filed: Mar. 11, 2019

(86) PCT No.: PCT/JP2019/009663
§ 371 (c)(1),
(2) Date: Sep. 13, 2020

(87) PCT Pub. No.: WO2019/176851
PCT Pub. Date: Sep. 19, 2019

(65) Prior Publication Data
US 2021/0377096 A1    Dec. 2, 2021

(30) Foreign Application Priority Data
Mar. 12, 2018 (JP) .............................. JP2018-044788

(51) Int. Cl.
*G06F 15/173* (2006.01)
*H04L 41/04* (2022.01)
(Continued)

(52) U.S. Cl.
CPC ............ *H04L 41/04* (2013.01); *H04L 61/103* (2013.01); *H04L 61/6022* (2013.01)

(58) Field of Classification Search
CPC .......................... H04L 61/103; H04L 61/6022
(Continued)

(56) References Cited

U.S. PATENT DOCUMENTS

2005/0027880 A1* 2/2005 Emmot ................. H04L 45/124
709/238
2015/0207634 A1* 7/2015 Keeni ..................... H04L 45/70
370/401

FOREIGN PATENT DOCUMENTS

JP    2002-26935 A    1/2002
JP    2004-56604 A    2/2004
(Continued)

OTHER PUBLICATIONS

ISR; Japanese Patent Office; Tokyo, Japan; dated Jun. 4, 2019.

*Primary Examiner* — Hee Soo Kim
(74) *Attorney, Agent, or Firm* — Patshegen IP; Moshe Pinchas

(57) ABSTRACT

A system for estimating contact duration between a pair of communication apparatuses. The system includes a storage device and a monitoring apparatus connected to the apparatuses to collect ARP packets broadcast in the network by a first communication apparatus, and to add timestamp information to the ARP packets, and to store the ARP packets with the timestamp in the storage device DB. The monitoring apparatus further extracts selected ARP packets from the ARP packets stored in the storage device DB, wherein the selected ARP packets includes destination MAC address which is the same as a MAC address of a second communication apparatus, wherein the timestamp information of the selected ARP packets is within a predetermined time range TM. The monitoring apparatus further estimates contact duration between the first and second communication apparatuses based on timestamp information of the selected ARP packets.

6 Claims, 5 Drawing Sheets

(51) Int. Cl.
*H04L 61/103* (2022.01)
*H04L 101/622* (2022.01)

(58) Field of Classification Search
USPC .......................................................... 709/223
See application file for complete search history.

(56) References Cited

FOREIGN PATENT DOCUMENTS

| | | |
|---|---|---|
| JP | 2011-114423 A | 6/2011 |
| WO | 2009/031453 A1 | 3/2009 |

* cited by examiner

[Figure 1]
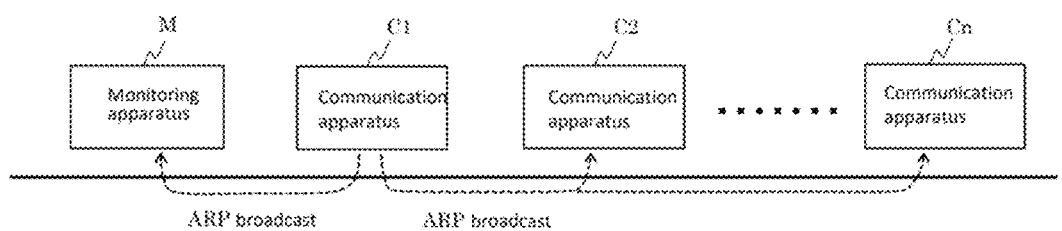

[Figure 2]
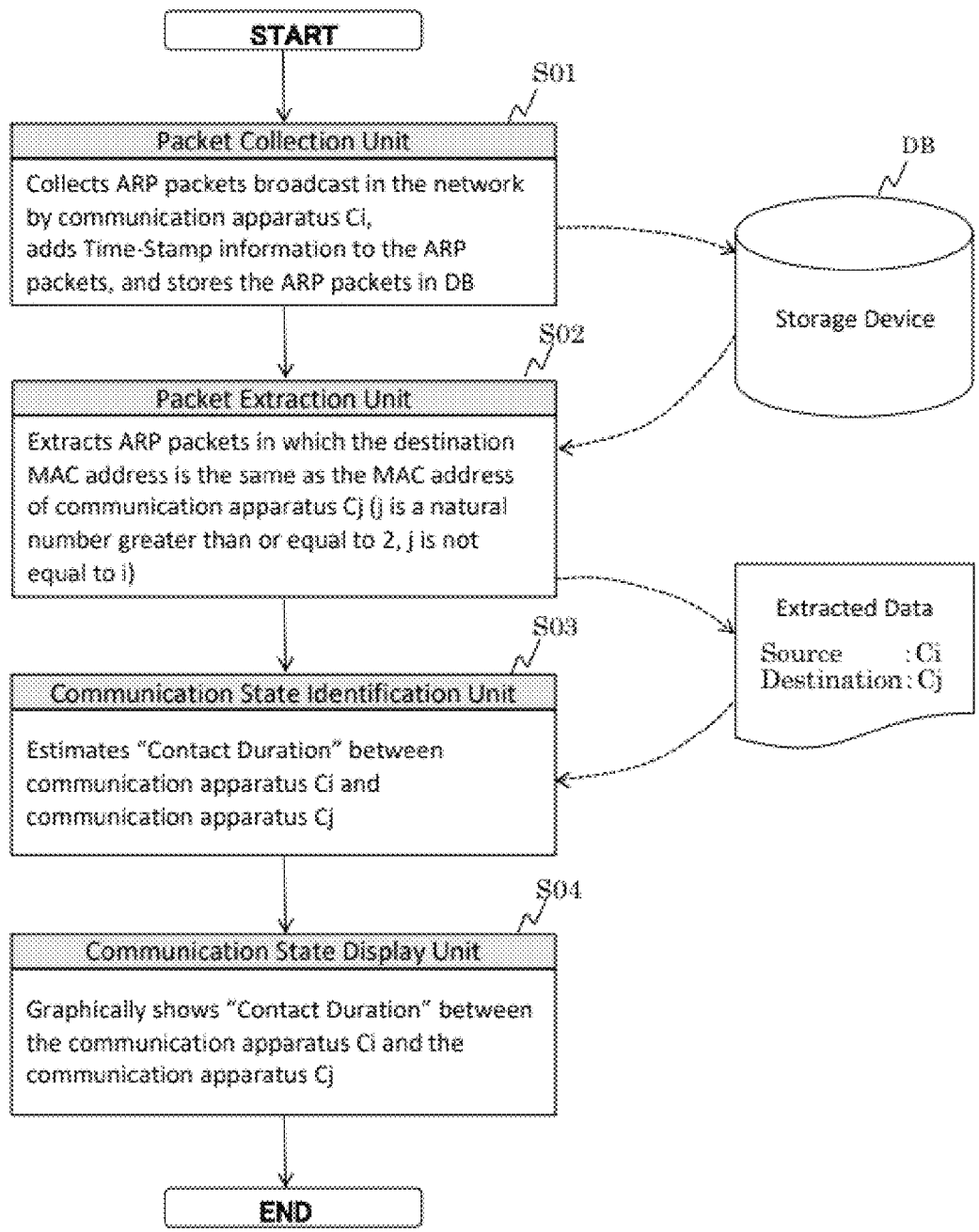

[Figure 3]

Table-1

| IP Address | MAC Address |
|---|---|
| IP(C1) | MAC(C1) |
| IP(C2) | MAC(C2) |
| IP(C3) | MAC(C3) |
| IP(C4) | MAC(C4) |
| IP(C5) | MAC(C5) |
| . | . |
| . | . |

Store Destination MACs by referring to Table-1

Table-2 <Stored ARP Broadcast Packets>

| Time Stamp | Source MAC | Destination IP | Destination MAC |
|---|---|---|---|
| TS1 | MAC(C1) | IP(C2) | MAC(C2) |
| TS2 | MAC(C1) | IP(C3) | MAC(C3) |
| TS3 | MAC(C1) | IP(C4) | MAC(C4) |
| TS4 | MAC(C1) | IP(C2) | MAC(C2) |
| TS5 | MAC(C1) | IP(C2) | MAC(C2) |
| TS6 | MAC(C1) | IP(C3) | MAC(C3) |
| TS7 | MAC(C1) | IP(C4) | MAC(C4) |
| TS8 | MAC(C1) | IP(C3) | MAC(C3) |
| TS9 | MAC(C1) | IP(C2) | MAC(C2) |
| TS10 | MAC(C1) | IP(C2) | MAC(C2) |

Table-3 <Extracted ARP Broadcast Packets (Source: C1, Destination: C2)>

| Time Stamp |
|---|
| TS1 |
| TS4 |
| TS5 |
| TS9 |
| TS10 |

<Estimated "Contact Duration">

<Case1> (TS4-TS1)<MP1, (TS5-TS4)<MP1, (TS9-TS5)<MP1, (TS10-TS9)<MP1

Contact Duration within time range TM;

Contact Duration = (TS10 − TS1) + MP1

<Case2> (TS4-TS1)<MP1, (TS5-TS4)<MP1, (TS9-TS5)≥MP1, (TS10-TS9)<MP1

Contact Duration within time range TM;

Contact Duration = (TS5 − TS1) + (TS10 − TS9) + MP1

[Figure 4]
VIEW Example 1    "Contact Duration" between C1 and C2, between C1 and C3, between C1 and C4, and between C1 and C5
<Time Interval 8:00~9:00>
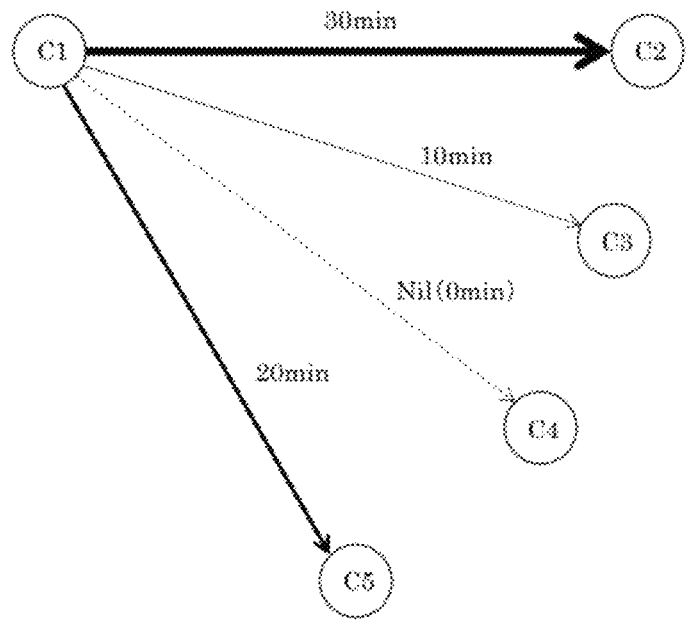
<Time Interval 21:00~22:00>
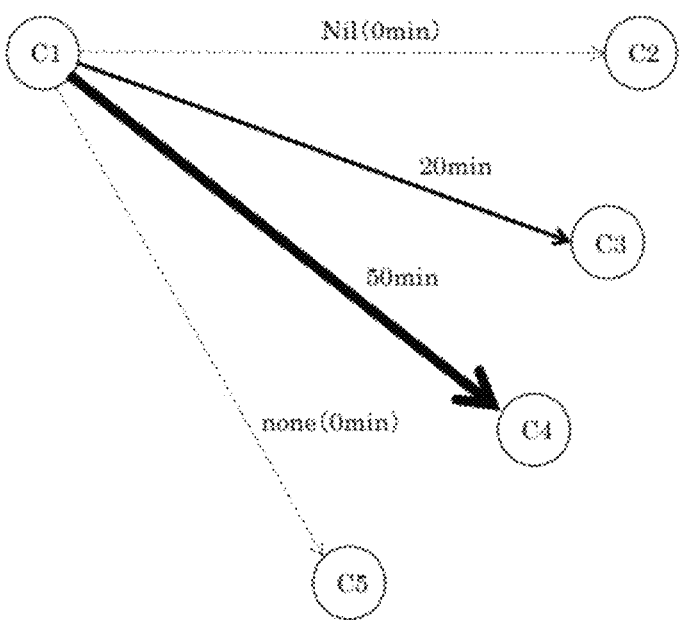

[Figure 5]
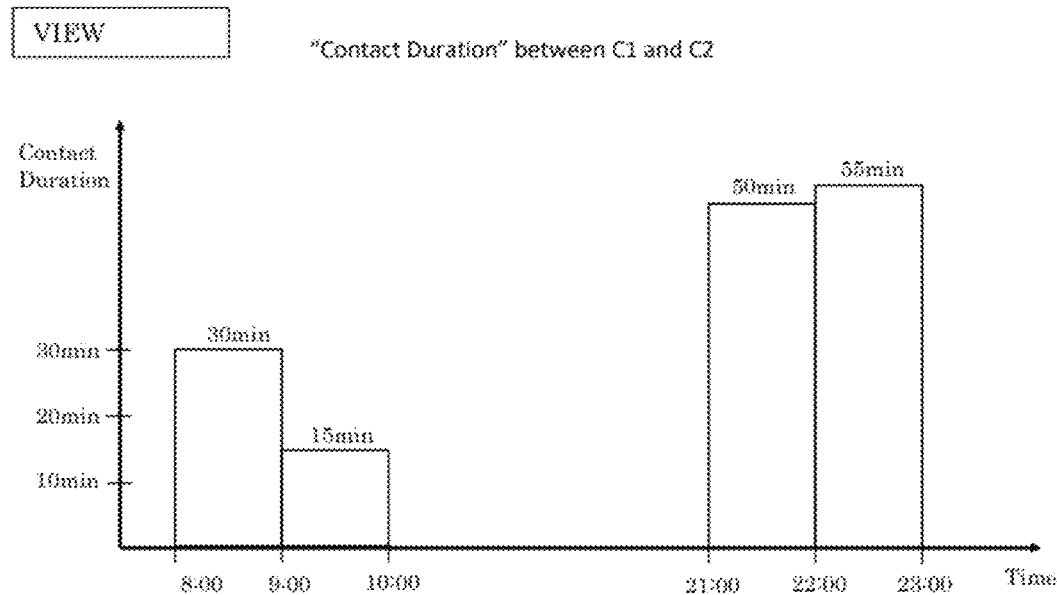

SYSTEM FOR ESTIMATING CONTACT DURATION BETWEEN A PAIR OF COMMUNICATION APPARATUSES

TECHNICAL FIELD

The present invention relates to a system for monitoring communication state between communication apparatuses by passive means in a network.

BACKGROUND TECHNOLOGY

In TCP/IP communication, ARP (Address Resolution Protocol) is used to fetch a destination MAC address of the device corresponding to a destination IP address.

ARP is used to obtain a MAC address (Physical layer address) from an IP address. The MAC address and corresponding IP address is cached in the "ARP table". A communication apparatus (source apparatus) broadcasts an ARP packet containing the destination IP address. A communication apparatus corresponding to the destination IP address receives the broadcast ARP packet and transmits a unicast ARP packet, in which its MAC address is included, to the source apparatus. The source apparatus receives the unicast ARP packet extracts the destination MAC address and caches it in its ARP table. Later, the communication apparatus (source apparatus) is able to transmit an IP packet to a destination IP address by referring to the ARP table.

Further, the information in the ARP table is retained for a specified period of time (Aging Time), and is deleted after the aging time elapses. After the information is deleted, the ARP table information is regenerated by the procedure described above when the need arises.

DISCLOSURE OF THE INVENTION

Problem to be Solved by the Invention

As described above, in TCP/IP communication, ARP packets are broadcast in a network, as a result it is possible to monitor communication state between a pair of communication apparatuses by monitoring broadcast ARP packets. For example, it is possible to monitor broadcast ARP packets in a network within a predetermined period, and estimate "Contact Duration" for communication apparatus pairs based on the time (Time-Stamp) at which the ARP packets were seen. Here, "Contact Duration" is defined as an estimate of how long communication has continued between a pair of communication apparatuses.

The purpose of the present invention is to provide a system for monitoring the communication state between a pair of communication apparatuses by passive means in the network and estimating the "Contact Duration" between the pair of communication apparatuses.

Means to Solve the Problem

In order to achieve the above purpose, the invention described in claim 1 is a system for estimating "Contact Duration" between a pair of communication apparatuses by passive means in a network in which communication apparatuses Ci (i is a natural number greater than or equal to 2) and a monitoring apparatus M are connected, wherein the monitoring apparatus M comprises of:

a packet collection unit configured to collect ARP packets broadcast in the network by communication apparatus Ci, add Time-Stamp information to the collected ARP packet, and store the collected packet with Time-stamp in a storage device DB;

a packet extraction unit configured to extract the ARP packets in which the destination MAC address is the same as the MAC address of communication apparatus Cj (j is a natural number greater than or equal to 2, j is not equal to i) from the ARP packets stored in said storage device DB, wherein the Time-Stamp information of the ARP packets is within a predetermined time range TM;

a communication state identification unit configured to estimate "Contact Duration" between communication apparatus Ci and communication apparatus Cj based on Time-Stamp information of the ARP packets (Source MAC address: Ci, Destination MAC address: Cj) extracted by said packet extraction unit; and a communication state display unit configured to graphically show "Contact Duration" between communication apparatus Ci and communication apparatus Cj within the time range TM estimated by said communication state identification unit.

The invention described in claim 2 is the system according to claim 1, wherein said communication state identification unit estimates "Contact Duration" between communication apparatus Ci and communication apparatus Cj using equation (2) under constraint of equation (1) from the Time-Stamp information $TS_m$ (m: a natural number, p: a natural number, q: a natural number, $p \leq m \leq q$, $1 \leq p \leq N-1$, $2 \leq q \leq N$, N: Number of extracted ARP packets) of ARP packets (Source MAC address: Ci, Destination MAC address: Cj) within the time range TM and a predetermined monitoring parameter MPi of the communication apparatus Ci.

$$\{TS_{m+1} - TS_m\} < MPi \quad (1)$$

$$\text{Contact Duration} = \{TS_q - TS_p\} + MPi \quad (2)$$

The invention described in claim 3 is the system according to claim 2, wherein said parameter MPi is defined as a time interval value based on the characteristics of communication apparatus Ci and is defined for each communication apparatus Ci.

The invention described in claim 4 is the system according to claim 1-3, wherein said communication state identification unit computes "Contact Duration" as the sum of multiple "Contact Durations" calculated by the equation (2) under condition of the equation (1).

The invention described in claim 5 is the system according to claim 1-4, wherein said communication state identification unit generates an alarm, if "Contact Duration" exceeds a predetermined threshold.

The invention described in claim 6 is the system according to claim 1-5, wherein said communication state display unit comprises of:

a unit configured to graphically show "Contact Duration" between communication apparatus Ci and communication apparatus Cj on a displayed link between said communication apparatus Ci and said communication apparatus Cj by utilizing the difference in line shape;

a unit configured to graphically show "Alarm Notification" on said link if the alarm is generated; and a unit configured to graphically show "Contact Duration" between communication apparatus Ci and communication apparatus Cj for each predetermined time slot.

Effect of the Invention

The invention produces the effect of being able to monitor communication state between communication apparatuses by passive means in the network and estimate "Contact Duration" between a pair of communication apparatuses without causing any additional load on the network.

"Contact Duration" is defined as an estimate of how long communication has continued between a pair of communication apparatuses. Therefore, the invention produces the effect of being able to quantitatively grasp "Contact Duration" for communication apparatus pairs.

Further, the invention produces the effect of detecting an unauthorized access if "Contact Duration" between a pair of communication apparatuses exceeds a predetermined threshold.

BRIEF DESCRIPTION OF DRAWINGS

FIG. 1 shows an example of network configuration for carrying out "Execution Example 1" of the present invention.

FIG. 2 shows a flowchart of an example process executed by the monitoring apparatus for carrying out "Execution Example 1" of the present invention.

FIG. 3 shows an example of data recorded in the recording device DB and an example of "Contact Duration" estimation for carrying out "Execution Example 1" of the present invention.

FIG. 4 shows an example of a graphical display of the "Contact Duration" between C1 and C2, between C1 and C3, between C1 and C4, and between C1 and C5 for carrying out "Execution Example 1" of the present invention.

FIG. 5 shows an example of a graphical display of the "Contact Duration" between C1 and C2 for carrying out "Execution Example 1" of the present invention.

EXPLANATION OF CODES USED IN THE DIAGRAMS

M: monitoring apparatus
C1~Cn: communication apparatuses

BEST MODE FOR CARRYING OUT THE INVENTION

In the following, the prototype embodying best mode of the present invention is described with reference to figures. However, the present invention is not limited to this prototype.

1. Execution Example 1

The system for carrying out "Execution Example 1" of the present invention are concretely explained with reference to FIG. 1-5.

As shown in FIG. 1, the monitoring apparatus M estimates "Contact Duration" between a pair of communication apparatuses by monitoring ARP packets broadcast by communication apparatuses by passive means in a network in which communication apparatuses Ci (i is a natural number greater than or equal to 2) and a monitoring apparatus M are connected. Here, "Contact Duration" is defined as an estimate of how long communication has continued between a pair of communication apparatuses. Also, the network as described above is assumed to be a relatively small company LAN or intranet.

Next, the process executed by the monitoring apparatus M is concretely explained with reference to FIG. 2. As shown in FIG. 2, the packet collection unit S01 collects ARP packets broadcast in the network by communication apparatus Ci, adds Time-Stamp information to the ARP packets, and stores the Source MAC address, Destination IP address, and Time-Stamp information of the ARP packets in a storage device DB.

An example of data recorded in the recording device DB is shown in FIG. 3 "Table-2". As shown in FIG. 3 "Table-2", in this example, 10 ARP request packets broadcast by communication apparatus C1 are recorded in the recording device DB with the Time-Stamp information (TS1 to TS10) added. Further, referring to "Table-1", information of "Destination MAC address" corresponding to "Destination IP address" is stored in the DB. Here, "Table-1" generated as the latest table containing the IP address and corresponding MAC address of a communication apparatus is stored in the recording device DB by the monitoring apparatus M.

Next, the packet extraction unit S02 extracts the ARP packets in which the destination MAC address is the same as the MAC address of a communication apparatus Cj (j is a natural number greater than or equal to 2, j is not equal to i) from the ARP packets stored in the storage device DB, wherein the Time-Stamp information of the ARP packets is within a predetermined time range TM.

As shown in FIG. 3 "Table-3", in this example, the ARP packets in which the destination MAC address is the same as the MAC address of communication apparatus C2 are extracted from ARP request packets broadcast from communication apparatus C1 within the time range TM. As a result, 5 packets with Time-Stamp value is "TS1", "TS4", "TS5", "TS9", and "TS10" have been extracted.

Next, the communication state identification unit S03 estimates "Contact Duration" between communication apparatus Ci and communication apparatus Cj based on Time-Stamp information of the ARP packets (Source MAC address: Ci, Destination MAC address: Cj) extracted by said packet extraction unit.

The communication state identification unit S03 estimates "Contact Duration" between communication apparatus Ci and communication apparatus Cj using equation (2) under constraint of equation (1) from the Time-Stamp information TSm (m: a natural number, p: a natural number, q: a natural number, p≤m≤q, 1≤p≤N−1, 2≤q≤N, N: Number of extracted ARP packets) of ARP packets (Source MAC address: Ci, Destination MAC address: Cj) within the time range TM and a predetermined monitoring parameter MPi of the communication apparatus Ci.

$$\{TS_{m+1} - TS_m\} < MPi \quad (1)$$

$$\text{Contact Duration} = \{TS_q - TS_p\} + MPi \quad (2)$$

Here, said parameter MPi is defined as a time interval value based on the characteristics of communication apparatus Ci and is defined for each communication apparatus Ci. Further, for example, said parameter MPi is defined a little larger than "Aging Time" with reference to "Aging Time" set in the ARP table of communication apparatus Ci.

Further, the communication state identification unit S03 computes the "Contact Duration" as the sum of multiple "Contact Durations" calculated by the equation (2) under condition of the equation (1).

Next, the process for estimating "Contact Duration" is concretely explained with reference to FIG. 3.
<Case-1>
When Time-Stamp value ("TS1", "TS4", "TS5", "TS9", and "TS10") of ARP request packets satisfies the equation (1), that is, in case {TS4−TS1}<MP1, and {TS5−TS4}<MP1, and {TS9−TS5}≥MP1, and {TS10−TS9}<MP1, "Contact Duration" is estimated as follows.

Contact Duration={TS10−TS1}+MP1

<Case-2>

When Time-Stamp value ("TS1", "TS4", "TS5", "TS9", and "TS10") of ARP request packets does not satisfy the equation (1), for example, in case {TS4−TS1}<MP1, and {TS5−TS4}<MP1, and {TS9−TS5}≥MP1, and {TS10−TS9}<MP1, "Contact Duration" is estimated as follows.

Contact Duration={TS5−TS1}+{TS10−TS9}+MP1

"Case-1" and "Case-2" shown above are an example of a method for estimating "Contact Duration". It makes it possible to quantitatively grasp "Contact Duration" of a communication apparatus pair by estimating "Contact Duration"

Further, the communication state identification unit S03 generates an alarm, if "Contact Duration" exceeds a predetermined threshold. Therefore, it becomes possible to detect an unauthorized access if "Contact Duration" of a communication apparatus pair exceeds a predetermined threshold.

Also, for example, it is conceivable that said threshold is defined based on the following criteria.

<Criteria for Defining the Threshold>

(a) The threshold is defined separately for each time period TM.
  For example, the threshold is defined to be large, because the number of accesses is high during the daytime (for example 8:00-20:00) and the threshold is defined to be small because the number of accesses is low during the nighttime (for example 20:00-8:00).
(b) The threshold is defined based on the characteristics of the communication apparatus pair Ci and Cj.
  For example, when communication apparatus Cj is a server, the threshold value is defined in consideration of the number of accesses from communication device Ci to the server.

Next, communication state display unit S04 graphically displays "Contact Duration" between communication apparatus Ci and communication apparatus Cj within the time range TM identified in said communication state identification unit. Communication state display unit S04 is specifically described below.

(A) a unit configured to graphically indicate "Contact Duration" between communication apparatus Ci and communication apparatus Cj on a link between said apparatus Ci and said apparatus Cj by utilizing the difference in line shape;
(B) a unit configured to graphically indicate "Alarm Notification" on said link if the alarm is generated;
(C) a unit configured to graphically display "Contact Duration" between communication apparatus Ci and communication apparatus Cj for each predetermined time slot;

The unit (A) is described with reference to FIG. 4. FIG. 4 shows an example graphical display of "Contact Duration" between C1 and C2, between C1 and C3, between C1 and C4, and between C1 and C5.

As shown in FIG. 4, "Contact Duration" within Time-Slot "8:00-9:00" is displayed, and "Contact Duration" within Time-Slot "21:00-22:00" is displayed. In addition, the Time-Slot value can be arbitrarily selected.

As shown in FIG. 4, "Contact Duration" within Time-Slot "8:00-9:00" between C1 and C2 is "30 min", "Contact Duration" between C1 and C3 is "10 min", "Contact Duration" between C1 and C4 is "0 min", and "Contact Duration" between C1 and C5 is "20 min". Then, "Contact Duration" is graphically indicated by utilizing the line shape. In this example, "Contact Duration" is graphically indicated by making the line thickness proportional to the numerical value of "Contact Duration". Here, as an indicator, not only the line thickness but also the line type, line color, or some other line attribute may be used.

Also, "Contact Duration" for Time-Slot "21:00-22:00" between C1 and C2 is "0 min", "Contact Duration" between C1 and C3 is "20 min", "Contact Duration" between C1 and C4 is "50 min", and "Contact Duration" between C1 and C5 is "0 min". In a manner similar to the above, "Contact Duration" is graphically indicated by utilizing the line thickness.

In the example shown in FIG. 4, within Time-Slot "8:00-9:00", it can be seen that although there is no access between C1 and C4, there are many accesses between C1 and C2. Also, within Time-Slot "21:00-22:00", it can be seen that although there is no access between C1 and C2, and between C1 and C5, there are many accesses between C1 and C4.

Next, the unit (B) is described with reference to FIG. 4. As described above, it generates an alarm, if "Contact Duration" exceeds a predetermined threshold. In the example shown in FIG. 4, "Contact Duration" within Time-Slot "21:00-22:00" between C1 and C4 is "50 min", and "Contact Duration" is graphically indicated by utilizing the line shape (for example, line color) if "Contact Duration" exceeds the threshold. This makes it possible to easily indicate the link of a communication apparatus pair for which the alarm has been notified.

Next, the unit (C) is described with reference to FIG. 5. FIG. 5 shows an example of graphically indicating "Contact Duration" between C1 and C2.

As shown in FIG. 5, "Contact Duration" between C1 and C2 is shown for each predetermined Time-Slot. In the example shown in FIG. 5, "Contact Duration" within Time-Slot "8:00-9:00", Time-Slot "9:00-10:00", Time-Slot "21:00-22:00", and Time-Slot "22:00-23:00" is shown. In addition, the Time-Slot value can be arbitrarily selected.

As shown in FIG. 5, "Contact Duration" for Time-Slot "8:00-9:00" is "30 min", "Contact Duration" for Time-Slot "9:00-10:00" is "15 min", "Contact Duration" for Time-Slot "21:00-22:00" is "50 min", and "Contact Duration" for Time-Slot "8:00-9:00" is "55 min". Then, "Contact Duration" is graphically displayed by utilizing the bar height in a bar graph.

In the example shown in FIG. 5, within Time-Slot "21:00-23:00", it can be seen that there are many accesses between C1 and C2.

As described above, "Contact Duration" is defined as an estimate of how long the communication has continued between a pair of communication apparatuses. Therefore, it is possible to quantitatively grasp the "Contact Duration" for communication apparatus pairs in a network. Further, it is possible to easily detect an unauthorized access from the alarm that is raised if "Contact Duration" exceeds a predetermined threshold.

What is claimed is:

1. A system for estimating contact duration between a pair of communication apparatuses Ci, where i is a natural number greater than or equal to two, are connected: the system comprising:
  a storage device;
  a monitoring apparatus connected to said apparatuses and being configured to collect ARP packets broadcast in the network by communication apparatus Ci, and to add timestamp information to the ARP packets, and to store the ARP packets with the timestamp in the storage device DB; said monitoring apparatus is further configured to extract selected ARP packets from the ARP packets stored in said storage device DB, wherein said selected ARP packets include a destination MAC address which is the same as a MAC address of communication apparatus Cj, where j is a natural number greater than or equal to two, and j is not equal to i, wherein the timestamp information of the selected ARP packets is within a predetermined time range TM; said monitoring apparatus is further configured to estimate contact duration between communication apparatus Ci and communication apparatus Cj based on timestamp information of the selected ARP packets; and a display unit configured to graphically display the contact duration between communication apparatus Ci and communication apparatus Cj within a predetermined time range TM.

2. The system according to claim 1, wherein said monitoring apparatus estimates the contact duration between communication apparatus Ci and communication apparatus Cj using equation (2) under constraint of equation (1) from the timestamp information $TS_m$ of said selected ARP packets within the time range TM and a predetermined monitoring parameter $MP_i$ of the communication apparatus Ci, wherein m, p and q are natural numbers, $p \leq m \leq q$, $1 \leq p \leq N-1$, $2 \leq q \leq N$, wherein N is Number of extracted ARP packets, $$\{TS_{m+1} - TS_m\} < MPi \quad (1)$$

$$\text{Contact Duration} = \{TS_q - TS_p\} + MPi \quad (2)$$

3. The system according to claim 2, wherein said parameter MPi is a time interval value and is predefined for each communication apparatus Ci.

4. The system according to claim 2, monitoring apparatus is further configured such that when there are zero or more contact durations estimated by the equation (2) under condition of the equation (1), a sum of those contact durations is specified as the contact duration within the time range TM.

5. The system according to claim 1, wherein said monitoring apparatus is further configured to generate an alarm, if the contact duration exceeds a predetermined threshold.

6. The system according to claim 1, wherein said display unit comprises of:
a unit for graphically displaying the length of the contact duration between communication apparatus Ci and communication apparatus Cj on a displayed link between said communication apparatus Ci and said communication apparatus Cj by utilizing the thickness of line representing said link;
a unit for graphically displaying an alarm notification on said link if the alarm is generated; and
a unit for graphically displaying the contact duration between communication apparatus Ci and communication apparatus Cj for each predetermined time slot.

* * * * *